Feb. 12, 1924. 1,483,472
F. H. NORTON
METHOD AND MEANS FOR DETERMINING LIGHT INTENSITIES
Filed May 26, 1921 2 Sheets-Sheet 1

Inventor
Frederick H. Norton
by Roberts, Roberts & Cushman
attys.

Feb. 12, 1924. 1,483,472
F. H. NORTON
METHOD AND MEANS FOR DETERMINING LIGHT INTENSITIES
Filed May 26, 1921 2 Sheets-Sheet 2
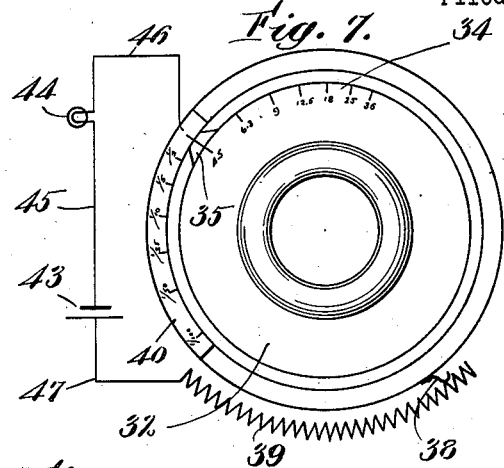
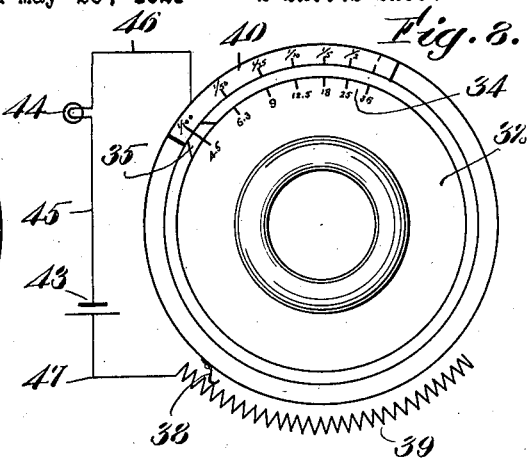
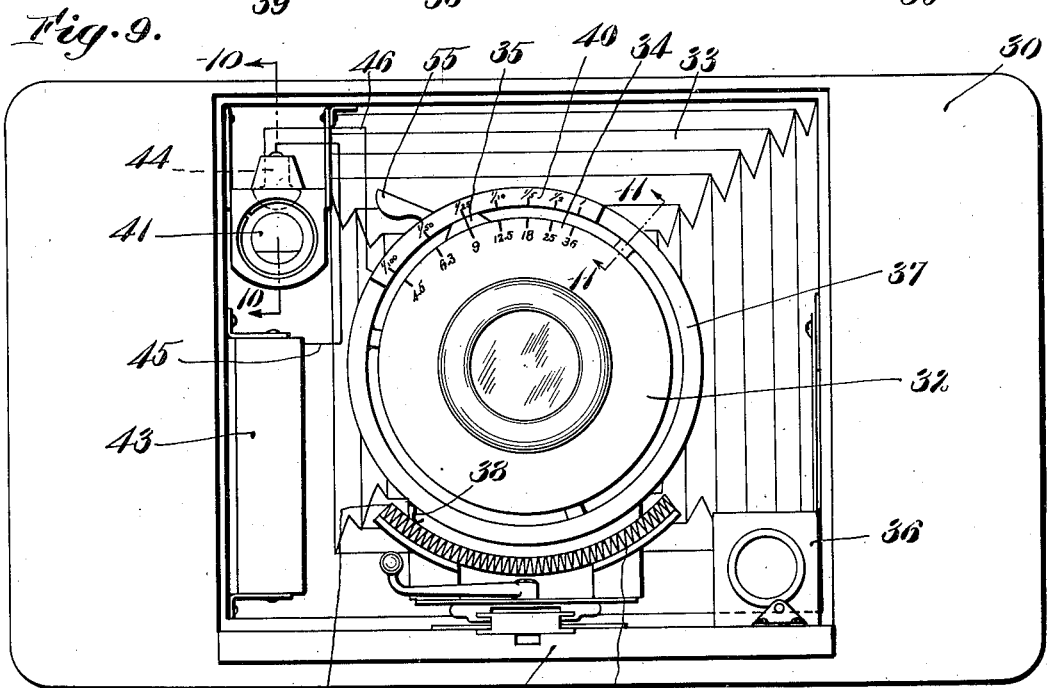
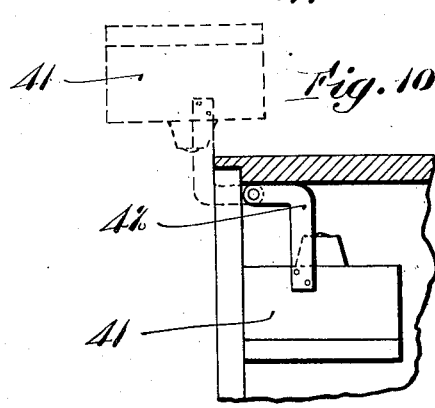
Inventor
Frederick H. Norton
by Roberts Roberts & Cushman
attys Patented Feb. 12, 1924.

1,483,472

UNITED STATES PATENT OFFICE.

FREDERICK H. NORTON, OF HAMPTON, VIRGINIA.

METHOD AND MEANS FOR DETERMINING LIGHT INTENSITIES.

Application filed May 26, 1921. Serial No. 472,842.

*To all whom it may concern:*

Be it known that I, FREDERICK H. NORTON, citizen of the United States of America, and resident of Hampton, in the county of Elizabeth City and State of Virginia, have invented new and useful Improvements in Methods and Means for Determining Light Intensities, of which the following is a specification.

This invention relates to photometry, and to photometric measurement ancillary to photography, and susceptible of use in any situation where it is desirable to determine the degree of illumination of an object field or to determine the light value of a source of illumination.

The principal objects of the invention are to provide a method of and means for determining light values which is quick and accurate, which while preferably utilizing an electric cell does not depend upon the constancy of the potential produced by the cell, and which may be employed in conjunction with the adjustable exposure opening or other exposure adjustment of any type of camera including a folding camera.

In one aspect the present invention comprises comparing the unknown illumination, for example the illumination of an object field to be photographed, with a variable illumination, preferably light from an electric lamp energized by an electric cell, the variable illumination first being adjusted to a predetermined value, and then adjusted with reference to the first adjustment an amount sufficient to bring the two illuminations into a known proportionate relationship, whereby the value of the unknown illumination will be indicated by the amount of said second adjustment. For example, when using an electric lamp and cell, the first adjustment may be effected by varying the resistance of the circuit until the incandescent filament just begins to glow, and the second adjustment may be effected by varying the resistance until the illumination of the lamp is substantially equal to the unknown illumination. In this way variations in the potential of the cell are compensated for, owing to the fact that the light from the lamp varies with the resistance of the circuit in approximately the same ratio at different cell potentials (within a certain range) when starting from the point at which the filament begins to glow. This will be clear from the following examples.

First, with the cell fully charged, move the rheostat up to the point where the filament begins to glow and then to the point where the lamp produces one candlepower; secondly, with the cell somewhat below full charge, repeat the operations. While the filament will begin to glow at different points in the two examples, and the one candlepower will be attained at different points, the distance between the two points of adjustment in the second example will be approximately the same as the distance between the two points in the first example.

As is well-known cameras are provided with various types of mechanism for varying the exposure of the film or other sensitized element. For example, the most common type of camera has mechanism for varying the exposure aperture and mechanism for varying the shutter speed; and cameras provided with focal plane shutters usually have additional mechanism for varying the exposure opening in the shutter, either by varying the width of a single opening or by bringing into play one of several openings of different widths.

In another aspect the invention comprises a unique correlation between the aforesaid variable illumination and the variable mechanism for varying the exposure of the sensitized element, and a conjunctive adjustment of the two variable factors. In the ordinary camera, for example, the exposure scale associated with the variable illumination mechanism may be so correlated with the aperture scale that when the exposure scale is set in a predetermined relation to the aperture scale at the end of the first adjustment of the variable illumination, the second adjustment of the variable illumination will bring the exposure scale into such position relative to the aperture scale that the proper exposure will be indicated on the exposure scale for any aperture adjustment.

In order more clearly to set forth the aforesaid and other aspects of the invention, I have illustrated two concrete embodiments of the invention in the accompanying drawings, in which:

Fig. 7 is a diagrammatic view of the second embodiment;

Fig. 8 is a similar view showing the parts in a different position of adjustment;

Fig. 9 is a front elevation of the folding camera having the second embodiment of the invention applied thereto, the camera being open and the bellows being extended;

Fig. 10 is a detail section on line 10—10 of Fig. 9;

Fig. 11 is a detail section on the line 11—11 of Fig. 9.

Figure 1:
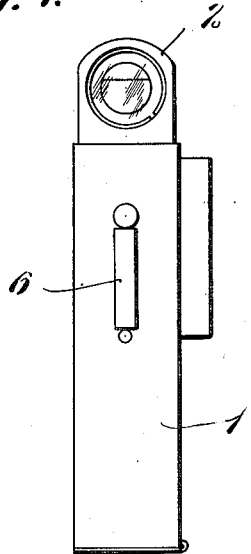
Figure 1 is an end elevation of one embodiment.
Figure 2:
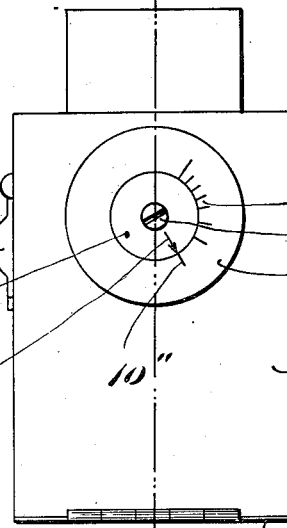
Fig. 2 is a side elevation of the same.

The particular embodiment of the invention illustrated in Figs. 1 to 6 comprises a rectangular casing 1, having a central opening in the top covered by an upper casing 2 secured to the lower casing by screws 3. The lower casing is adapted to house a dry-cell 4, a hinge cover 5 being provided at the bottom to permit the insertion and removal of the dry-cell. Slidably mounted on the end of the casing 1 is an electric switch 6 adapted to make and break contact with the terminal 7 of the dry-cell, this switch being illustrated as of the well-known type adapted to hold itself in either open or closed position. Fast on the side of the casing 1 is a circular member 8 adapted to carry a resistance element 9 between its outer flange and its central hub. Fitting over the member 8 and resistance 9 is a cup-shaped member 10 carrying the scale 10′ and having a recess in the center of its outer face to receive the index member 11. A screw 12 extends through the scale index member 11 and threads into the hub of the member 8. The index member 11 is provided with a central boss 13 adapted to extend through a central opening in the scale member 10 and bear against the hub of member 8 so that when the screw 12 is tight the index member 11 is held against rotation while the scale member 10 is free to rotate. The scale member 10 carries on its inner face a spring contact member 14 adapted to wipe over the resistance 9 when the scale member 10 is rotated. The member 11 is provided with an index mark 11′ adapted to cooperate with the scale 10′.

Depending around the opening in the top of the casing 1 is a tapered tubular flange 15 interiorly threaded at its lower end to receive the incandescent lamp 16. The other terminal 17 of the cell 4 extends across the lower end of the lamp socket so as to contact with the central terminal 18 of the lamp. The other terminal of the lamp connects with the terminal 7 of the battery through the casing 1 and switch 6.

Figure 4:
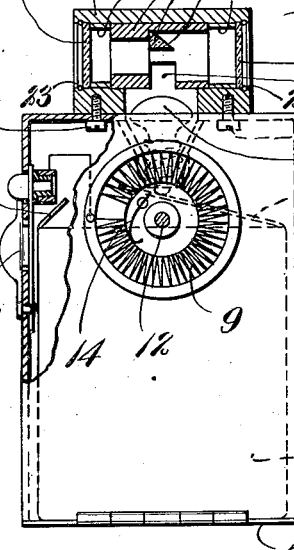
Fig. 4 is a view similar to Fig. 2, parts being removed and other parts being shown in section.
Figure 6:
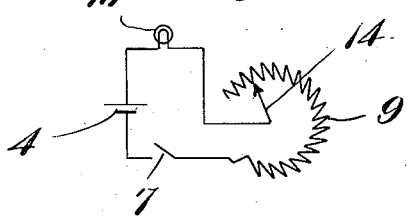
Fig. 6 is a diagram showing the circuit connections.

The upper casing 2 is provided with a cylindrical bore adapted to receive a sleeve 19 and two glass disks 20 and 21, the sleeve and disk being held in position by spacers 22 and lock rings 23. The interior diameter of the sleeve 19 is somewhat greater at the right-hand end than at the left-hand end (Fig. 4) and an opening 24 is provided in the portion of larger internal diameter to permit light from the lamp 16 to radiate into the sleeve. A total-reflection prism 25 is mounted above the opening 24 with its total-reflection surface 26 arranged to reflect light from the lamp 16 through the disk 20. Either the horizontal or the vertical face of the prism 25 is preferably ground. With the eye positioned as indicated in Fig. 4, light reflected from lamp 16 by prism 25 is seen above the line 27, and light from the object field is seen below the line 27. The glass 21 is preferably colored so that the light transmitted therethrough is of approximately the same color as the light emanating from the lamp 16. An opening 28 is preferably provided in the side of the casing 2 so that the filament of the lamp 16 may be viewed directly, a cover 29 for this opening being provided if desired.

Figure 3:
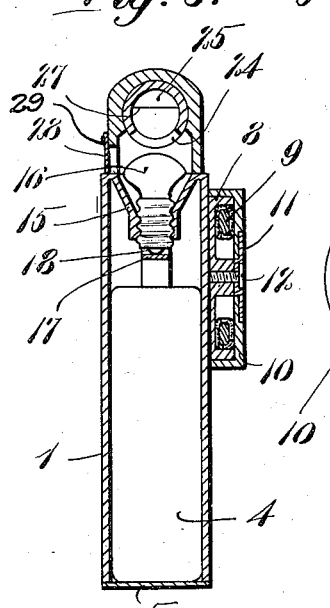
Fig. 3 is a vertical section on line 3—3, Fig. 2.
Figure 5:
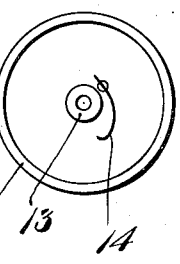
Fig. 5 is an inside view of one of the parts shown in the preceding figures.

The operation of the device illustrated in Figs. 1 to 6 is as follows: The switch 6 is closed. The member 10 carrying contact 14 is then turned until the filament of the lamp begins to glow, the filament being observed through opening 28. The screw 12 is loosened, the index member 11 is rotated until the index mark 11′ registers with the end 10″ of the scale 10′, and the screw is then tightened, thereby locking the index member 11 in position but leaving the scale member 10 free to turn. The device is then held so that the observer looking through the axial opening of the top casing 2 from left to right (Fig. 4) can see the object field below the line 27 (Fig. 3). The scale member 10 is then rotated to vary the resistance of the circuit until the light from lamp 16, which is visible above the line 27 (Fig. 3), is substantially equal in intensity to light from the object field, the light above the line 27 being diffused if either the vertical or horizontal surface of the prism 25 is ground. The indication of the index 11′ on the scale 10′ represents the light value of the object field, the scale 10′ being calibrated in any desired manner.

If the scale 10′ is calibrated in terms of seconds or fractions of a second, the scale will not be a uniform scale if the turns in the resistance coil are uniformly spaced about the axis of the coil.

The scale may be made non-uniform with any desired degree of non-uniformity. This applies also to the second embodiment hereinafter described.

The particular embodiment shown in Figs. 7 to 11 comprises a camera box 30 of the folding type, the box having a hinged door 31 upon which the carriage 32, carrying the usual lens, diaphragm and shutter, is adapted to slide when the bellows 33 are extended. 34 indicates the aperture scale; 35 the aperture-controlling member having an index line adapted to indicate the size of the aperture on the scale 34, 55 the shutter lever, and 36 the view finder. All of this construction is similar to that embodied in an early type of camera manufactured by the Bausch & Lomb Optical Company.

According to the present invention a ring 37 is mounted to rotate about the housing 32 in any suitable manner, as for example as shown in Figs. 9 and 11. The ring 37 carries a contact member 38 adapted to wipe over the resistance element 39 mounted on the carriage concentrically with the ring. An exposure scale 40 is adjustably mounted on the ring 37 so that it may be adjusted circumferentially of the ring. The scale 40 is so positioned that the index 35 is adapted to register therewith, as well as with scale 34.

A view device 41, functionally similar to the device mounted on the top of the casing 1 in Figs. 1 to 5, is mounted on a bracket 42 pivoted to the box 30 so that the device may be folded into the box as indicated in Fig. 9 and as indicated by the full lines in Fig. 10, or it may be swung out into the position indicated by the broken lines in Fig. 10. The dry-cell 43 may be mounted beneath the device 41 in an otherwise unoccupied position when the camera is closed, as indicated in Fig. 9. The lamp 44 in the view device 41, the cell 43, the resistance 39 and the contact 38 may be connected in series in any suitable manner, but for the purpose of illustration I have shown them in Fig. 9 as connected by wires 45, 46 and 47, the wire 46 connecting with terminal 38 through the ring 37.

The operation of the embodiment shown in Figs. 7 to 11 is as follows: With the bellows extended and with the view device 41 swung into the position shown by the broken lines in Fig. 10 the ring 37 is rotated, thereby moving the contact 38 along the resistance 39, until the filament of lamp 44 begins to glow. The scale 40 is then adjusted along ring 37 into a predetermined relationship to the scale 34, for example until the right-hand end of scale 40 registers with the left-hand end of scale 34 or with the index 35 when set at the left-hand end of scale 34, the left-hand end of scale 34 or member 35 thus serving as an index for scale 40. The parts are shown in this position in Fig. 7. The ring 37 is then rotated until the illumination produced by the lamp 34 is substantially equal to the illumination of the object field, this being determined by looking through the view device 41 as described in connection with the first embodiment. The parts are then in the position shown in Fig. 8. After the scale 40 has been thus adjusted, the proper exposure for any aperture opening is indicated by index 35 on scale 40. For example with the index member 35, which controls the aperture opening, set at $f$ 4, 5, the proper exposure is 1/100 second, as indicated in Fig. 8. If the index member 35 be moved to $f$ 9, the proper exposure is 1/25 second, as indicated in Fig. 9.

The combination of my improved photometer with the exposure mechanism of a camera is claimed in my copending application Serial No. 540,755, filed March 3, 1922, which is a division of this application.

I claim:

1. The method of ascertaining the illumination of an object field which comprises determining the visibility point of an adjustable variable illuminant comparing the illumination of the object field therewith and noting the amount of adjustment required to bring the variable illumination from its visibility point to an adjustment in which it equals the illumination of the object field.

2. In apparatus for determining light intensities, a circuit including a source of luminosity and a variable resistance element controlling the brilliancy of said source, and a compound dial for the resistance element, said resistance element including a movable member for producing the variations having a portion of the dial mounted for movement therewith, the other portion of the dial being mounted for independent movement with respect thereto, and means for securing the independently movable portion of the dial in desired relatively adjusted position.

3. A device of the character described comprising inherently variable illumination producing means, means for positively varying the illumination produced thereby, means for indicating the visibility point of the variable illumination and means for indicating the adjustment required to increase the illumination from the visibility point to that of an unknown illumination to be tested.

4. A device of the character described comprising means for producing a variable illumination, means for comparing said illumination with an unknown illumination, adjustable means for indicating the visibility point of said variable illumination, and means for varying the illumination to a value having a known proportionate relationship to the unknown illumination, and a co-operating scale and index movable relatively to each other in said second adjustment to denote the variance from the visibility point.

5. A device of the character described comprising an electric light, means for independently viewing said light and illumination from an object field in juxtaposed relation, a source of current and a resistance in circuit with said light, and means for adjusting the resistance of said circuit to produce predetermined visibility of the light, adjustable means for indicating said visibility point and a scale and indicating means associated with the resistance adjusting device and co-operating with said adjustable indicating means to denote additional adjustments made with respect to said visibility point.

6. In apparatus for determining light intensities, a source of light of variable intensity, a movable member for controlling the intensity of the light emitted by said source, a member on which the said source and said movable member are mounted, and co-operating indexes on said members, one of said indexes being adjustable on its member.

7. In apparatus for determining light intensities a variable source of light, a movable member for controlling the intensity of the light emitted by said source, a support on which both said source and said member are mounted, an index on the support, and a scale on said member co-operating with said index, said scale being adjustable on said member, whereby said control member may be moved until the light emitted from said source is just visible and the scale may then be adjusted relative to said index whereupon further movement of said member to cause the light emitted by said source to equal that of an object field will indicate the light value of said field.

Signed by me at Langley Field this 19 day of May 1921.

FREDERICK H. NORTON.